3,431,061
PRESERVING METHOD FOR OUTDOOR STORAGE OF WOOD USED IN PAPER MANUFACTURE

Richard R. Chase and James C. McKee, Savannah, Ga., assignors to Union Bag-Camp Paper Corporation, New York, N.Y., a corporation of Virginia
No Drawing. Filed Oct. 11, 1963, Ser. No. 315,692
U.S. Cl. 21—60.5          2 Claims
Int. Cl. A61l 15/00

ABSTRACT OF THE DISCLOSURE

A method for the outside storage of a pile of wood pieces, such as cordwood, pulpwood or wood chips used as the raw material in paper manufacture in order to preserve the pile in outside storage prior to manufacturing paper from the preserved pile consisting essentially of encasing the pile of wood pieces and the atmosphere between these pieces in a flexible membrane which is highly resistant to the passage of oxygen and to moisture vapor, the limited consumption of oxygen within the membrane-encased pile on standing causing the level of oxygen within the encased atmosphere to reach a value below 0.5% of oxygen by volume and thereby preventing destructive microbial and fungal growth to thereby minimize rotting, decay, insect attack and similar deterioration and make the stored wood usable for high quality paper manufacture.

---

This invention relates to a novel method for long term storage of pulpwood of the type used in the manufacture of paper and to preparation of pulpwood storage piles conforming to the novel method of preserving wood.

The invention allows the preservation of large piles of cordwood, pulpwood, or wood chips by restricting decay, insect attack, and moisture loss by encasing the wood in a bag or cocoon, with said bag being made of material that is highly resistant to oxygen and water-vapor passage. After the cocoon is formed, the gaseous oxygen inside the cocoon is consumed in natural oxidation reactions to reduce the concentration of oxygen within the encasing cocoon to a level low enough to prevent an undesirably high rate of decay by the action of microorganisms. The impermeability of the covering is sufficient to maintain an oxygen level within the casing that is substantially below that of normal air, and wood storage for periods of more than one year without significant damage to wood quality is possible. From 200 to 20,000 cord units of roundwood, or the equivalent mass of chips are thus encased by the method of the invention.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In accordance with the invention, freshly cut pulpwood, chips, roundwood or sawdust is placed in a unit pile on an encasing low cost, flexible yet strong, water-impermeable and vapor impermeable sheet. Within the container during the prolonged storage period, the level of oxygen is maintained at a value below about 0.5% by volume, which represents an amount of oxygen insufficient to sustain commercially significant aerobic microbial or fungal growth. All wood exposed to the outer elements has already been contaminated with decay-producing microbes and fungi, and these naturally occurring micro-organisms are sufficiently active to consume the residual oxygen which is present after the sealing of the pile cover. Depending upon the amount of wood encased for storage and the relative volume of air present inside the container, the initial consumption of oxygen to an oxygen level below 0.5% requires from one to three days. The minute amount of decay occurring during the oxygen reduction period and during subsequent storage is confined to the surface of the wood and is so slight that it does not impair pulp and paper quality and uniformity for the product manufactured from the stored wood.

In a preferred embodiment of the invention freshly cut pulpwood or chips are placed in a unit pile on a properly protected base sheet of the barrier material that is highly resistant to passage of oxygen and water vapor, such as a low cost thermoplastic sheet or scrap papermaker's felt which is made impermeable to oxygen with a suitable sealing binder.

A suitable thermoplastic sheet material is polyethylene, polyvinyl chloride, copolymer of vinyl chloride and vinylidene chloride, copolymer of vinyl chloride and vinyl acetate, rubber hydrochloride, cellulose acetate, polyester such as polyethylene terephthalate, polycarbonate such as Deloin, polycarbonamide nylon such as hexamethylene adipamide polymer, or the like.

A sheet, or multiple sheets, of the covering material is placed over the wood pile, and the base sheet and covering sheets are then suitably sealed to encase the unit load, either by conventional heat-sealing devices, suitable mechanical means; or, if desired, any of the appropriate adhesives for sealing the plastic can be used to make a cocoon of impermeable covering material about the wood pile.

The covering material may consist of a synthetic material such as polyurethane foam applied as a spray coating rather than as a film. The spray coating may be applied in the form of several layers to constitute several plies of the cocoon shaped barrier material surrounding the wood pile.

The felt material which is used in one embodiment of the invention is the scrap papermaker's felt which has already served its purpose and cannot be reclaimed. This felt is impregnated with asphalt or some other sealant. It may be reinforced with wire and with paper or paperboard. Thus the covering material can be quite heavy, but need not involve any great expense.

When it is desired to protect the base membrane of the pile from mechanical damage by the wood to be placed upon it, sufficient layers of felt, bark, or other cushioning material may be spread beneath or above the membrane to provide this protection. Protection of the covering membrane can be accomplished by spreading one or more layers of felt, paper, canvas, or similar material between the wood pile and the membrane or over the outside of the membrane.

Several plies of flexible plastic sheet material may be used, or several plies of asphalt impregnated felt may be used. These multiple plies may be all of one material or of composite material and are readily adhered to each other by heat-sealing, mechanical clamping, or adhesive which is conveniently done at the storage site.

As a low cost example of a barrier sealing means which can be in accordance with the invention, polyethylene sheet may be used and the polyethylene may be sealed with an adhesive such as copolymer of butadiene and acrylonitrile in an aliphatic ketone solvent. Alternatively, the polyethylene sheet may be heatsealed to form a cocoon. An asphalt based adhesive may be used to bond the seams of asphalt impregnated felt as a barrier layer. Alternatively, the barrier material may be used in conjunction with mechanical clamps to seal the seams of the plastic covering material.

Accordingly, it will be seen that the method of the invention can be carried out with cheap, readily available materials by relatively unskilled labor at extremely low cost in comparison to the prior methods of pulpwood preservation which have been suggested.

Considerable study has been devoted to the problem of long term pulpwood storage in order to satisfy the need of the pulp and paper manufacturer to furnish a high quality product at low cost since the quality of the product depends strongly upon the quality and uniformity of the pulpwood used as the raw material.

The manufacturing cost depends upon the cost of the wood which, in turn, depends upon the maintenance of a large inventory of pulpwood in outdoor storage at the paper mills during all times of the year.

The main problem in outside storage is decay which occurs in the wood and results in inferior pulp. Storage of any form of pulpwood for longer than 4 to 6 months, even in the comparatively cool fall and winter periods in the southeastern area of the United States, has resulted in substantial decay.

Rotten pulpwood increases the manufacturing cost since a portion of the pulpmaking wood fiber has been physically destroyed and it is necessary to treat the remainder of the wood with additional chemicals before the material can be converted to a useful and uniform product. The yield of pulp from a given dry weight of rotted wood is lower than the yield from an equal dry weight of fresh wood. Even after these additional expenses have been met the pulp produced from decayed wood makes inferior paper at a higher manufacturing cost than that of the high quality paper made from fresh pulpwood.

Considerable experimentation has been conducted in the laboratory on the preservation of wood against microbial and fungal attacks, and there have been heretofore suggested the following general methods of preservation:

(1) Storage in an atmosphere cold enough to inhibit growth of mold and fungi at an objectionable rate.

(2) Storage under water to eliminate oxygen necessary for microbial growth.

(3) Sealed storage in an atmosphere of artificially created inert gas to eliminate oxygen necessary for microbial growth.

(4) Treatment with chemical fungicides and bactericides to check fungus and mold growth.

Refrigeration, as suggested in (1) above, is not practical to solve the problem of long term storage at the pulp manufacturing plants in the southern United States.

Storage of pulpwood in water under procedure (2) above, artificial inert gas atmosphere storage under method (3) above, and the fungicide method under procedure (4) above were tested and compared against the storage method of the present invention for periods of 6 to 12 months under a constant temperature of about 95° F. This temperature represents a more favorable climate for fungus growth than would be encountered in the storage yard of the manufacturing plant.

The refrigeration method (1) was also tested, and a control sample was stored in a moist atmosphere at 95° F. with a constant supply of humidified, fresh air being fed to the chips. Fifty-five gallon drums were filled with fresh pine chips. Before the drums were closed, the pine chips were seeded with a culture of standard decay fungi including those of the genera peniophora, lenzites, pencillium, aspergillus, chaetomium, fusarium, myxotrichum, and torula. The decay fungi of these genera are known to decompose and decay wood in outside storage. The drums stored under methods (1), (2) and (4) were sealed and stored for periods of six and of twelve months. The drums stored under method (3) were equipped with a device for supplying a steady, low volume stream of nitrogen gas to the chips throughout the storage periods. At the end of the six and twelve month periods, the chips wer examined for decay, appearance, moisture content, and change in density. Pulp was made from each sample by a standard cooking process used at the pulpmaking plant, e.g., the standard kraft sulfate process of manufacture. The results are summarized below.

Inoculated or seeded pine chips stored in 55 gallon drums at a temperature of from 30° to 40° F. for a period of 12 months were fully preserved, of excellent strength and good moisture content, and they produced high quality pulp in yield equivalent to the yield produced from a sample of the chips prior to storage. In every respect, the cold storage method provided wood as good as freshly harvested wood.

The method of the invention was tested by filling two 55-gallon drums with inoculated chips and sealing the drums. At the time of sealing, the atmosphere of gas within the chip mass was made up of normal, fresh air.

The method of the invention utilizing the exclusion of air from the stored chips and method number (3), utilizing introduced humidified nitrogen showed no decay of the wood. Chips from both of these tests produced high quality pulp in yield equivalent to that of unstored chips cut from fresh wood.

The tests which were carried out for chips stored under water at 95° F. for 12 months demonstrated a slight softening of the chips. The pulp manufacturing procedure had to be modified to compensate for the significant amount of water imbibed by the chips during storage. The moisture content was about 10% higher than in the case of fresh chips or of chips stored for one year in accordance with the invention. Mullen strength of the finished paper was less and the tensile strength was slightly less which indicates that this type of storage might cause failure to meet the rigid requirements for the manufacture of certain bags, e.g., multiwall and grocery bags.

Accordingly, the tests carried out on the water-stored chips demonstrate that changes in the pulp and paper making procedures would be needed, at the cost of additional labor and/or material expense. These changes in manufacturing costs are eliminated by storage in accordance with the present invention since the chip quality is fully equivalent to freshly cut chips.

In the tests of fungicidal treatment before storage, saturated paraformaldehyde solution was used as the fungicide because of its low volatility and favorable non-residual characteristics after pulping.

The strength characteristics of the pulp made from the fungicidally treated and stored chips were significantly inferior to the pulp made from chips stored in accordance with the invention or from freshly cut chips. However, the physical characteristics and pulping characteristics of the fungicidally treated chips were superior to those of the untreated chips stored under similar conditions. Wood to be stored in accordance with the invention may be treated with a fungicide before or during storage in the bag or cocoon to provide an additional measure of protection against decay.

The control samples of chips in the unsealed drums to which humidified fresh air was fed became quite dark after six months and even darker after twelve months, and the visible mold and fungus growth was substantial. The mechanical strength of the chips from these drums was poor after six and twelve months of storage, and wood density tests revealed substantial losses of wood substance by decay. The yield of pulp per given dry weight of wood was lower from these chips than from fresh wood stored in accordance with the present invention.

The foregoing tests in metal drums have been extended to arrive at the new method of packaging under oxygen and water vapor resistive membranes in accordance with the details as described hereinbefore. Storage in metal containers is very expensive in comparison to the simplified storage in accordance with the invention. It is of economic importance that the results which have been determined in the metal container tests can be duplicated on a large scale without investing in a metal container inventory.

Thus, for the first time, it is possible to handle massive quantities of pulpwood, hundreds and thousands of times as large as the drums, for periods of one, two, three or more years without encountering substantial decay.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for the outside storage of a pile of wood pieces used as the raw material in paper manufacture in order to preserve said pile in outside storage prior to manufacturing paper from the preserved pile consisting essentially of tightly encasing the pile of wood pieces in a flexible membrane in sheet form which is highly resistant to the passage of oxygen and to moisture vapor to completely surround said pile and atmosphere between the pieces of said pile in an oxygen-tight unit, permitting the pile to stand whereby the limited consumption of oxygen in the atmosphere between the pieces within the membrane-encased pile causes the level of oxygen to drop from the normal concentration in air to a value below 0.5% of oxygen by volume of atmosphere within the encased pile, this reduction in oxygen content preventing destructive microbial and fungal growth on the wood to thereby minimize rotting, decay, insect attack and similar deterioration and make the stored wood usable for high quality paper manufacture.

2. A process as claimed in claim 1 wherein said flexible membrane includes a thermoplastic resin sheet material which is selected from the group consisting of polyethylene, polyvinyl chloride, copolymer of vinyl chloride and vinylidene chloride, copolymer of vinyl chloride and vinyl acetate, rubber hydrochloride, cellulose acetate, polycarbonamide, polyester, polycarbonate, polyurethane and felt impregnated with asphalt.

References Cited

UNITED STATES PATENTS

| | | | |
|---|---|---|---|
| 775,636 | 11/1904 | Rugen et al. | 117—6 |
| 2,768,896 | 10/1956 | Lewis | 52—3 X |
| 2,913,429 | 11/1959 | Floria et al. | 260—29.7 |
| 2,981,637 | 4/1961 | Spencer et al. | 117—76 |
| 3,205,898 | 9/1965 | Sprague | 52—3 X |

MORRIS O. WOLK, *Primary Examiner.*

R. E. SERWIN, *Assistant Examiner.*

U.S. Cl. X.R.

21—7

UNITED STATES PATENT OFFICE
CERTIFICATE OF CORRECTION

Patent No. 3,431,061 March 4, 1969

Richard R. Chase et al.

It is certified that error appears in the above identified patent and that said Letters Patent are hereby corrected as shown below:

In the heading to the printed specification, line 5, "Union Bag-Camp Paper Corporation" should read -- Union Camp Corporation --.

Signed and sealed this 14th day of April 1970.

(SEAL)
Attest:

Edward M. Fletcher, Jr.
Attesting Officer

WILLIAM E. SCHUYLER, JR.
Commissioner of Patents